(12) United States Patent
Fujii et al.

(10) Patent No.: US 11,518,705 B2
(45) Date of Patent: Dec. 6, 2022

(54) NOZZLE TIP FOR PRODUCING GLASS FIBERS AND METHOD FOR PRODUCING GLASS FIBERS

(71) Applicant: Central Glass Company, Limited, Ube (JP)

(72) Inventors: Tsuyoshi Fujii, Matsusaka (JP); Masanori Saito, Matsusaka (JP)

(73) Assignee: Central Glass Company, Limited, Ube (JP)

( * ) Notice: Subject to any disclaimer, the term of this patent is extended or adjusted under 35 U.S.C. 154(b) by 280 days.

(21) Appl. No.: 16/477,390

(22) PCT Filed: Feb. 23, 2018

(86) PCT No.: PCT/JP2018/006603
§ 371 (c)(1),
(2) Date: Jul. 11, 2019

(87) PCT Pub. No.: WO2018/159469
PCT Pub. Date: Sep. 7, 2018

(65) Prior Publication Data
US 2020/0024177 A1    Jan. 23, 2020

(30) Foreign Application Priority Data

Feb. 28, 2017  (JP) .............................. JP2017-037449
Sep. 11, 2017  (JP) .............................. JP2017-173652

(51) Int. Cl.
C03B 37/02    (2006.01)
C03B 37/083   (2006.01)
C03B 37/075   (2006.01)

(52) U.S. Cl.
CPC ............ *C03B 37/02* (2013.01); *C03B 37/075* (2013.01); *C03B 37/083* (2013.01)

(58) Field of Classification Search
None
See application file for complete search history.

(56) References Cited

U.S. PATENT DOCUMENTS

| | | | |
|---|---|---|---|
| 5,062,876 A | * | 11/1991 | Jensen .................. C03B 37/083 65/475 |
| 5,462,571 A | | 10/1995 | Taguchi et al. |
| 2003/0131632 A1 | | 7/2003 | Konno et al. |

FOREIGN PATENT DOCUMENTS

| | | |
|---|---|---|
| CN | 102515505 A | 6/2012 |
| JP | 6-228806 A | 8/1994 |

(Continued)

OTHER PUBLICATIONS

WO 2017221471 translation, Yanase et al., Nozzle for Producing Glass Fibers Having Modified Cross-Section, Dec. 2017 (Year: 2017).*

(Continued)

*Primary Examiner* — Queenie S Dehghan
(74) *Attorney, Agent, or Firm* — Crowell & Moring LLP (57) ABSTRACT

A nozzle tip for producing glass fibers has a pair of long-side walls and a pair of short-side walls, each of the long-side walls and the short-side walls containing platinum or a platinum alloy, and a nozzle orifice for discharging the glass melt, the nozzle orifice being formed by the long-side walls and the short-side walls. The nozzle orifice has a flat hole shape in horizontal cross-section. Each of the long-side walls has a cut-out on a discharge side of the glass melt, a width of the cut-out being 10-55% of a length of a longitudinal center axis of the flat hole shape of the nozzle orifice. The pair of long-side walls has a symmetrical shape about the center axis of the nozzle orifice. This nozzle tip makes it possible to efficiently produce glass fibers having a desired cross-sectional shape.

19 Claims, 5 Drawing Sheets

(56) References Cited

FOREIGN PATENT DOCUMENTS

| JP | 6-234540 A | | 8/1994 | | |
|---|---|---|---|---|---|
| JP | 11043343 A | * | 2/1999 | ........... | C03B 37/075 |
| JP | 2000-344541 A | | 12/2000 | | |
| JP | 2003-48742 A | | 2/2003 | | |
| JP | 2003048740 A | * | 2/2003 | ........... | C03B 37/075 |
| JP | 2010-83750 A | | 4/2010 | | |
| JP | 2010-150127 A | | 7/2010 | | |
| JP | 2010-163342 A | | 7/2010 | | |
| WO | WO 99/28543 A1 | | 6/1999 | | |
| WO | WO 2017/221471 A1 | | 12/2017 | | |

OTHER PUBLICATIONS

JP 11043343, Saito et al., Nozzle tip for spinning highly flat glass fiber and glass fiber, Feb. 1999 (Year: 1999).*

International Search Report (PCT/ISA/210) issued in PCT Application No. PCT/JP2018/006603 dated May 1, 2018 with English translation (four (4) pages).

Japanese-language Written Opinion (PCT/ISA/237) issued in PCT Application No. PCT/JP2018/006603 dated May 1, 2018 (four (4) pages).

Chinese-language Office Action issued in Chinese Application No. 201880014287.X dated Jun. 1, 2021 (7 pages).

* cited by examiner

NOZZLE TIP FOR PRODUCING GLASS FIBERS AND METHOD FOR PRODUCING GLASS FIBERS

TECHNICAL FIELD

The present invention relates to a nozzle tip for producing glass fibers flat in cross-section, which is made of platinum or a platinum alloy, and a method for producing the glass fibers using the nozzle tips.

BACKGROUND TECHNOLOGY

Non-circular glass fibers, such as those with a flat shape in cross-section, are widely used as a filler material, due to their possibility to expect the strength improvement in complexation with resins, etc. as compared with normal glass fibers with a circular cross-section, and due to their possibility to prevent warping of complexation products with resins. This is considered, because non-circular glass fibers themselves are easily stacked, resin flowability is improved in the case of shaping by mixing with resin, and glass fiber dispersibility is excellent even if the glass fiber content is high. Although the process for producing non-circular glass fibers is similar to the process for producing circular glass fibers, it becomes necessary to have a special structure in a nozzle tip for drawing glass melts in the form of glass fibers in order to make a non-circular cross-section.

For example, Patent Publications 1 and 2 disclose nozzle tips for producing glass fibers with a flat shape in cross-section, and each nozzle tip is provided with a cut-out at a tip portion on a long-side wall side of a nozzle wall formed of long-side walls and short-side walls. For producing glass fibers with a flat shape in cross-section, it is necessary to draw and discharge a glass melt out of nozzle tips with a flat shape in cross-section of an end portion that discharges the glass melt, thereby quenching and fiberizing the glass melt. When fiberizing the glass melt, the glass melt tends to become round, since the glass melt is high in surface tension. Taking countermeasures against this is the point to produce glass fibers with a flat shape in cross-section.

For example, in Patent Publication 1, a tip end on one side of long-side walls of a nozzle, in which an end portion to discharge glass melt has an oval cross-section, is equipped with a cut-out. With this, while a side free from the cut-out structure keeps the temperature of the glass melt to maintain the shape of the flowing glass melt, viscosity of the glass melt on a side equipped with the cut-out structure is increased, thereby taking countermeasures against the force that the glass becomes round. Furthermore, in Patent Publication 2, nozzles each equipped with a cut-out on one side of long-side walls of the nozzle are inserted into a plate in a manner that the cut-outs are opposed to each other. Furthermore, in Patent Publication 3, one side or both sides of long-side walls of a flat-shape nozzle are provided with a broad cut-out(s). Through the cut-out, cooling gas increases viscosity of the glass melt on the long-side in the nozzle.

PRIOR ART PUBLICATIONS

Patent Publications

Patent Publication 1: International Publication WO 99/028543
Patent Publication 2: JP Patent Application Publication 2003-048742
Patent Publication 3: JP Patent Application Publication 2010-163342

DISCLOSURE OF THE INVENTION

Task to be Solved by the Invention

In the case of expecting resin strength improvement by complexation between glass fibers with a non-circular cross-section such as oval cross-section and resin, it is preferable that the cross-sectional shape is symmetrical about the longitudinal center axis. In addition to the cross-section being non-circular, if the cross-sectional shape is symmetrical about the longitudinal center axis, the glass fibers themselves are easily stacked. This contributes to improvement of resin flowability when shaping by mixing glass fibers with resin.

In the case of producing glass fibers that are non-circular in cross-sectional shape and are symmetrical about the longitudinal center axis, it is necessary that the shape of a nozzle tip for discharging glass melt as glass fiber is formed into a shape close to the cross-sectional shape of the glass fiber. That is, it is necessary to provide one equipped with a nozzle having a pair of long-side walls and a pair of short-side walls, which project flat, and a nozzle orifice for discharging the glass melt, which is formed by the long-side walls and the short-side walls. In addition to this, it is necessary that temperature profile of the glass melt flowing in the nozzle orifice is made even between the long-side walls.

The nozzle tips disclosed in Patent Publications 1 and 2 provide superior methods from the viewpoint of producing glass fibers flat in cross-section, but it is difficult that temperature profile of the glass melt in contact with each long-side wall of the nozzle tip is made even. That is, since the glass melt in contact with both long-side walls is uneven in viscosity, it becomes necessary to have a further device in order to produce glass fibers that are oval in cross-sectional shape and are symmetrical about the longitudinal center axis.

Furthermore, from the viewpoint of heat resistance and corrosion resistance of the nozzle tip, it is preferable that the nozzle tip is one made of platinum or a platinum alloy. However, since wettability between these members and glass melt is good, the glass melt fluidity difference between the cut-out portion and the wall portion becomes large. Thus, in the case of providing broad cut-outs such as Patent Publication 3, stability of flow of the glass melt in the nozzle orifice lowers.

In view of the above, it is a task of the present invention to provide a nozzle tip that is made of platinum or a platinum alloy and makes it easy to produce glass fibers flat in cross-section, and a method for producing glass fibers having a flat cross-section that is symmetrical about the longitudinal center axis of the flat cross-section.

Means for Solving the Task

The present invention provides a first nozzle tip for producing a glass fiber that is flat in cross-sectional shape, the nozzle tip being used by downwardly projecting from a bottom surface portion of a storage tank that stores a glass melt, the nozzle tip being characterized by comprising a pair of long-side walls and a pair of short-side walls, each of the long-side walls and the short-side walls comprising platinum or a platinum alloy, and a nozzle that has a nozzle orifice for discharging the glass melt, the nozzle being formed by the long-side walls and the short-side walls, wherein the nozzle orifice has a flat hole shape in horizontal cross-section, wherein each of the long-side walls has a cut-out on a discharge side of the glass melt, a width of the cut-out being 10-55% of a length of a longitudinal center axis of the flat hole shape of the nozzle orifice, and wherein the pair of long-side walls has a symmetrical shape about the center axis of the nozzle orifice.

In the above nozzle tip, each long-side wall is provided with a cut-out on a discharge side of the glass melt, and the shape of the pair of long-side walls is symmetrical about the longitudinal center axis of the nozzle orifice. That is, both cut-outs have the same or roughly the same size. Therefore, temperature profile of the glass melt in contact with each long-side wall of the nozzle is easily made even. From prior art, elements for producing glass fibers having a non-circular cross-section have been considered as:

1) maintaining the shape of the flowing glass melt on the long-side wall on one side by utilizing wettability between the glass melt and the platinum nozzle, and, to do this, it is advantageous that the long-side wall on one side is formed into a structure free from a cut-out; and 2) providing only another long-side wall with a cut-out to increase viscosity of the glass melt and satisfy taking countermeasures against the force that the glass becomes round.

The nozzle tip of the present invention is not one satisfying the elements 1) and 2). Even so, each long-side wall is provided with a cut-out, each long-side wall is made to be a symmetrical structure, and width of the cut-out is made to be 10-55% of the length of the longitudinal center axis of the nozzle orifice. With this, unexpectedly, it is possible to produce glass fibers that are oval in cross-sectional shape and are symmetrical about the longitudinal center axis.

In case that the cut-out width is less than 10% of the length of the longitudinal center axis of the nozzle orifice, it becomes difficult to obtain the advantageous effect by the cut-outs as mentioned in 2). On the other hand, in case that the cut-out width is greater than 55% of the length of the longitudinal center axis of the nozzle orifice, the difference of fluidity of the glass melt at a region with the cut-out and a region with no cut-out becomes large, stability of flow of the glass melt in the nozzle orifice lowers, and pulsation, etc. tend to occur when the glass flows out. In view of these, it is optional to adjust the cut-out width to preferably 15% to 55%, more preferably 20% to 55%, still more preferably 20 to 50%, of the longitudinal center axis of the nozzle orifice.

In the first nozzle tip, there is provided a second nozzle tip of the present invention, which is characterized in that the cut-out is formed at a center on a discharge side of the long-side wall. By making the pair of long-side walls have such structure, the advantageous effect by the cut-outs as mentioned in 2) tends to occur. Eventually, it becomes easier to produce glass fibers that are non-circular in cross-sectional shape and are symmetrical about the longitudinal center axis.

In the first or second nozzle tip, there is provided a third nozzle tip of the present invention, which is characterized in that an opening portion by the cut-outs has an area (a total of an area of the two cut-outs) that is 1% to 45% of a total area (the total area containing the area of the opening portion by the cut-outs) of an inner periphery of the pair of long-side walls and the pair of short-side walls. Hereinafter, this percentage is referred to as "the areal percentage of the opening portion". By adjusting the areal percentage of the opening portion within this range, the advantageous effect by the cut-outs as mentioned in 2) tends to occur. In case that the areal percentage of the opening portion is less than 1%, it becomes difficult to generate this effect. On the other hand, in the case of exceeding 45%, stability of flow of the glass melt in the nozzle orifice lowers, and pulsation, etc. tend to occur when the glass flows out. In view of these, the areal percentage of the opening portion may be preferably 3% to 40%, more preferably 5% to 35%.

In the first, second or third nozzle tip, there is provided a fourth nozzle tip, which is characterized in that the cut-out is rectangular in shape. By making the shape of the cut-outs rectangular, working when producing the nozzle tip becomes easier. Furthermore, the rectangular cut-out makes it possible to maximize the glass melt cooling effect by the cut-out. Furthermore, it becomes successful to stabilize flow of the glass melt, thereby lowering the occurrence of malfunctions, such as pulsation, when the glass flows out.

In the first, second, third or fourth nozzle tip, there is provided a fifth nozzle tip, which is characterized in that a ratio of a length of the longitudinal center axis to a length of the longest portion in a short-length direction of the nozzle orifice is from 2 to 8. By adjusting this ratio within this range, it becomes easy to produce non-circular glass fibers having a difference between the longer axis length and the shorter axis length. In case that this ratio is less than 2, the nozzle tip shape becomes close to circle, and it becomes difficult to produce non-circular glass fibers. On the other hand, in case that this ratio exceeds 8, the longer axis length becomes too long. Therefore, the number of the nozzle tips, which can be arranged in the same area, becomes less. In view of these, this ratio may be preferably 3 to 8, more preferably 3 to 6.

In the first, second, third, fourth or fifth nozzle tip, there is provided a sixth nozzle tip of the present invention, which is characterized in that an end surface on a side of the cut-out of the long-side wall has an inclined surface resulting from a gradual decrease of a thickness of the long-side wall toward the side of the cut-out, and that the inclined surface faces a side of the nozzle orifice. By having the inclined surface facing the side of the nozzle orifice, leak of the glass melt from the cut-out portion to the outside of the long-side wall is prevented, thereby lowering stain of the nozzle tip or the base plate by the glass melt. By this effect, it becomes easy to maintain the temperature surrounding the nozzle tip constant. Eventually, it becomes easier to produce glass fibers that are non-circular in cross-sectional shape and are symmetrical about the longitudinal center axis.

Furthermore, there is provided a method of the present invention for producing a glass fiber with a flat cross-section that is symmetrical about a longitudinal center axis of a flat cross-sectional shape. The glass fiber production method utilizes the first, second, third, fourth, fifth or sixth nozzle tip and comprises the steps of passing a glass melt through the nozzle orifice of the nozzle tip, which is fixed to a bottom surface of a storage tank that stores the glass melt; and drawing and discharging the glass melt out of the nozzle orifice, thereby quenching and fiberizing the glass melt. It becomes possible by this production method to efficiently produce glass fibers that are non-circular in cross-sectional shape and are symmetrical about the longitudinal center axis.

Advantageous Effect of the Invention

The nozzle tip for producing glass fibers of the present invention is successful to improve the efficiency of producing glass fibers that are non-circular in cross-sectional shape and are symmetrical about the longitudinal center axis.

MODE FOR IMPLEMENTING THE INVENTION

The nozzle tip for producing glass fibers that are flat in cross-section has a hole shape flat in cross-section. In the following, it is explained, based on an oblong shape as a typical hole shape. Examples of the cross-sectional shape are not limited to an oblong shape. It is possible to cite shapes such as gourd shape, dumb-bell shape, triangular shape, etc., besides rectangular, oval and trapezoidal shapes. Shapes analogous to these are also included. In the present specification, in case that the hole shape is an oblong shape, the length of the longitudinal center axis of the flat hole shape of the nozzle orifice is equal to the major axis.

Figure 1:
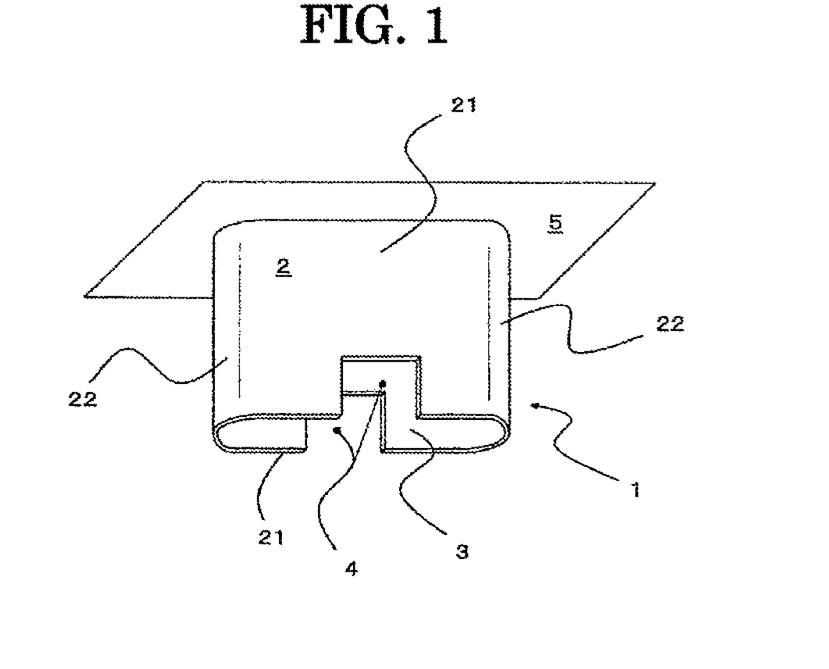
FIG. 1 is a perspective view showing a main part of a typical example of a nozzle tip 1 of the present invention.
Figure 2A:
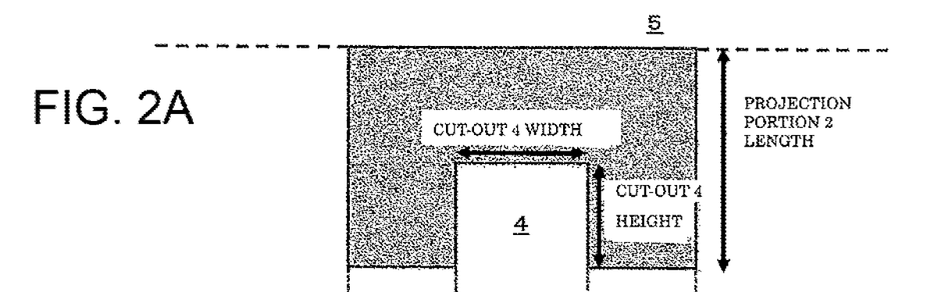
FIGS. 2A to 2B are views explaining in detail the main part of the nozzle tip 1 of FIG. 1.
Figure 2B:
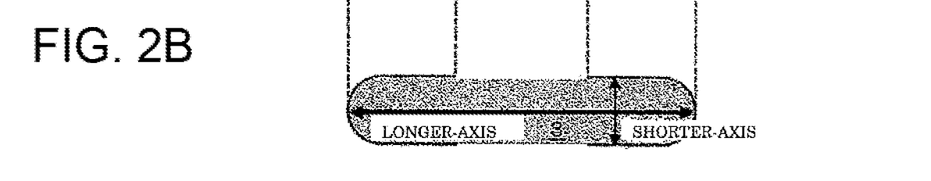
Figure 7:
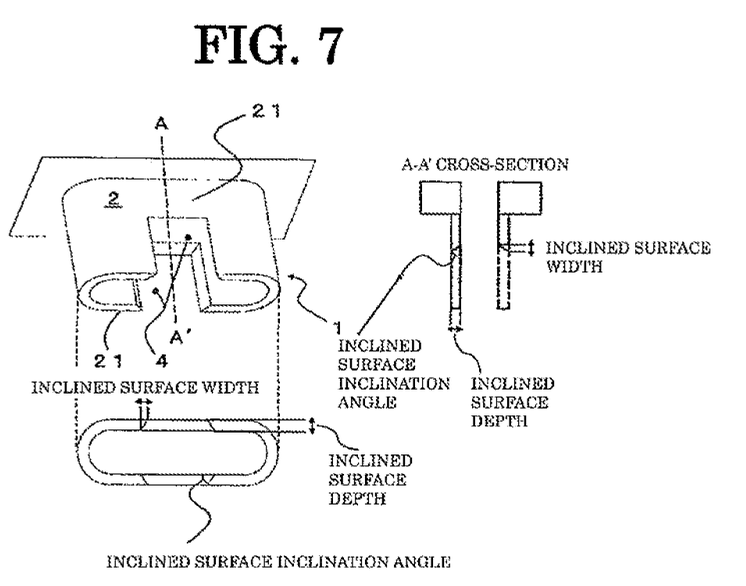
FIG. 7 is a view explaining in detail a main part of a typical example of a sixth nozzle tip 1 according to the nozzle tip 1 of the present invention.
Figure 8A:
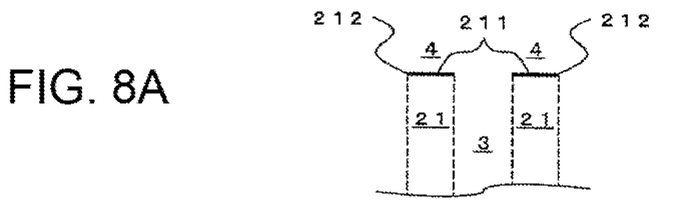
FIGS. 8A to 8D are views showing embodiments of a cross-section of an end surface on the side of the cut-outs 4 of the nozzle tip 1.
Figure 8B:
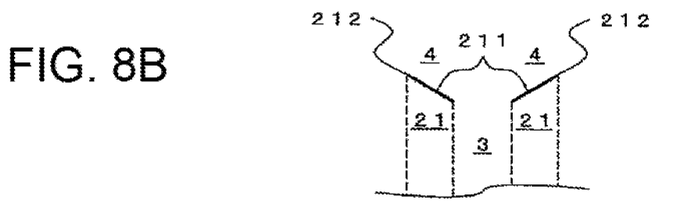
Figure 8C:
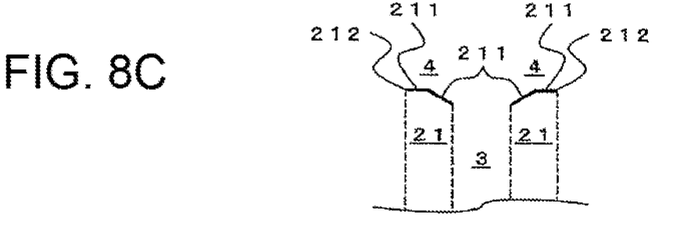
Figure 8D:
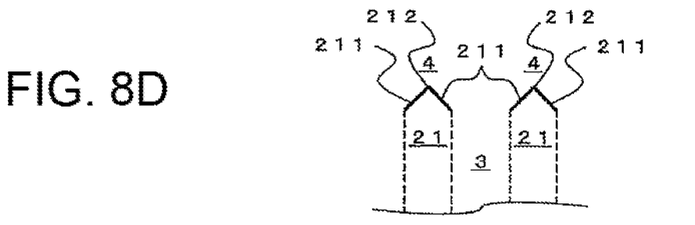

The nozzle tip of the present invention is explained by using the drawings (the following explanation includes the first, second, third, fourth, fifth and sixth nozzle tips). FIG. 1 is a perspective view showing a main part of a typical example of a nozzle tip 1 of the present invention. FIG. 2(a) is a view explaining in detail a main part on the side of a long-side wall 21 of the nozzle tip 1 when observing the nozzle tip 1 of FIG. 1 from the side of the long-side wall 21. FIG. 2(b) is a view explaining in detail a main part on the side of a nozzle orifice 3 of the nozzle tip 1 when observing the nozzle tip 1 of FIG. 1 from the side of the nozzle orifice 3. FIG. 7 is a view showing a main part of the nozzle tip, in which an end surface on the side of the cut-out 4 of the long-side wall 21 is equipped with an inclined surface resulting from a gradual decrease of the thickness of the long-side wall 21 toward the side of the cut-out 4, and in which the inclined surface faces the side of the nozzle orifice 3. FIG. 8 is a view showing embodiments of a cross-section of an end surface on the side of the cut-outs 4 of the nozzle tip 1 of FIG. 1.

The nozzle tip 1 includes a projection portion 2 forming a nozzle orifice 3 projecting from a bottom surface portion 5 (base plate) of a storage tank 6 that stores the glass melt. The projection portion 2 is equipped with a pair of long-side walls 21 with cut-outs 4 and a pair of short-side walls 22. The nozzle orifice has a hole shape that is flat in horizontal section. The nozzle orifice has a structure to pass through from the bottom surface portion 5 to a tip end (the glass melt discharge side). Each member of the long-side walls and the short-side walls is made of platinum or a platinum alloy. As examples of the platinum alloy, it is possible to cite an alloy prepared by combining platinum as a base with a noble metal(s) such as rhodium, gold, palladium and silver, or a reinforced metal in which fine particles of zirconia, etc. are dispersed in the noble metal or the alloy.

Considering strength of the nozzle tip 1, it is preferable to use a platinum rhodium alloy containing 5-30 weight % of rhodium in platinum, and a strengthened platinum rhodium alloy in which zirconia fine particles are dispersed in the platinum rhodium alloy, for each member. A nozzle tip may be produced by cutting work, casting work, pipe squeezing work, extension work, etc., inserted into a drilled platinum or platinum alloy plate (base plate), and then subjected to welding work, thereby making the nozzle tip 1. Alternatively, it is optional to conduct a direct cutting work on a base plate to produce a nozzle tip into one-piece with the base plate. Its own members may be made of the same metal or different metals. Furthermore, its own members may have a thickness of 0.05 mm to 5 mm and may have a common thickness.

Furthermore, the pair of long-side walls 21 has a shape that is symmetrical about a longer axis of an oval of a horizontal cross-section of the nozzle orifice 3, and is equipped with cut-outs 4. An opening portion by the cut-out 4 refers to a place surrounded by a summit portion 212 of an end surface on the side of the cut-out 4 of the long-side wall 21. It is preferable to form the cut-out 4 into a rectangular shape due to easiness of working when producing the nozzle tip. The width and the height of the cut-out are expressed, based on the summit portion 212.

The width of the cut-out 4 is 10-55%, preferably 15% to 55%, more preferably 20% to 55%, of the length of the longer axis of the nozzle orifice 3. The ratio of a length of the longitudinal center axis of nozzle orifice 3 to a length of a longest portion in a short-length direction can be adjusted to 2-8, preferably 3-8, more preferably 3-6. A specific length of each axis is selected by the fiber diameter of desired glass fibers. The longer axis can be adjusted to, for example, 2 mm to 10 mm, preferably 2 mm to 8 mm. The shorter axis can be adjusted to, for example, 0.3 mm to 2 mm, preferably 0.5 to 2 mm. The width of the cut-out 4 refers to the distance between the summit portions 212 of an end surface 211 on the cut-out side of the long-side wall 21.

Furthermore, the length of the projection portion 2 is determined in view of the draw amount from the nozzle tip of the glass melt. For example, it can be adjusted to, for example, 0.5 mm to 7 mm, preferably 0.5 mm to 5 mm. The capacity of the nozzle tip is calculated from cross-sectional area of the nozzle orifice 3 and length of the projection portion 2. For example, it is 0.3 to 140 mm$^3$, preferably 0.5 to 80 mm$^3$.

The height of the cut-out 4 is preferably 2% to 80% of the length of the projection portion 2 (the length from the bottom surface portion 5 to the tip end of the projection portion 2). In case that the height of the cut-out 4 is less than 2%, the glass melt cooling effect may not be sufficient. On the other hand, in case that the height of the cut-out 4 exceeds 80%, fluidity of the glass melt in the nozzle orifice 3 may become low. In view of these, the height of the cut-out 4 may be adjusted to preferably 2% to 60%, more preferably 10% to 60%, of the length of the projection portion 2. The height of the cut-out refers to the distance from the summit portion 212 on the end surface of the cut-out side of the long-side wall 21 to the tip end of the projection portion 2 in the vertical direction of the opening portion by the cut-out 4.

The opening portion by the cut-outs 4 has an area (a total of an area of the two cut-outs) that is 1% to 45%, preferably 3% to 40%, more preferably 5% to 35%, of the total area (the total area containing the area of the opening portion by the cut-outs 4) of an inner periphery of the pair of long-side walls 21 and the pair of short-side walls 22.

Furthermore, the cut-out 4 is formed preferably at a center on a discharge side of the nozzle orifice 3 of the long-side wall 21, and is preferably rectangular in shape. The capacity of the cut-out 4 (in the example of FIG. 1, a region formed by the width and the height of the cut-out 4 and depth (corresponding to the thickness of the nozzle tip) is preferably 1 to 35% of the capacity of the nozzle tip. In the example of FIG. 1, the long-side wall 21 forms a flat region, and the short-side wall 22 forms a curved region.

Furthermore, the end surface 211 on the cut-out side of the long-side wall may have an inclined surface resulting from a gradual decrease of the thickness of the long-side wall 21 toward the side of the cut-out 4. It is preferable that the inclined surface faces a side of the nozzle orifice 3. FIG. 7 shows one exemplary embodiment of the nozzle tip 1 provided with the inclined surfaces. Inclination of the inclined surface may have an arbitrary angle, for example, 15 degrees to 80 degrees. Furthermore, the width of the inclined surface may have an arbitrary value, while its upper limit is the distance from the summit portion 212 of the end surface on the side of the cut-out 4 of the long-side wall 21 to the bottom surface portion 5 or the boundary between the long-side wall 21 and the short-side wall 22. Similarly, depth of the inclined surface may have an arbitrary value, while its upper limit is the thickness of the long-side wall 21. Herein, the depth and the width of the inclined surface are defined as shown in FIG. 7.

The inclined surface may be provided to fully or partially cover the entirety in the direction along the length of the end surface of the cut-out side of the long-side wall 21. It is, however, preferable to fully cover the entirety in the direction along the length of the end surface of the cut-out side of the long-side wall 21, since the nozzle tip or base plate is not easily stained. The inclination angle, width, depth, etc. of the inclined surface may be common or different values at its parts. Exemplary embodiments of the cross-section of the end surface on the side of the cut-out 4 of the nozzle tip 1 of FIG. 1 are exemplarily shown in FIG. 8. FIG. 8(*a*) shows one provided with no inclined surface on the end surface on the side of the cut-out 4. FIGS. 8(*b*), 8(*c*) and 8(*d*) show ones each provided with an inclined surface, which faces the side of the nozzle orifice 3, on the end surface on the side of the cut-out 4. Furthermore, it suffices that the inclined surface has any surface of a flat surface, a curved surface and a polygonal surface, but a flat surface is preferable due to easiness in working.

Figure 3A:
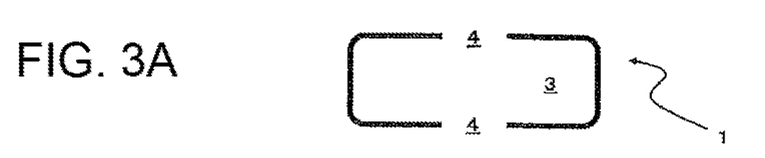
FIGS. 3A to 3C are views showing main parts when observing other embodiments of the nozzle tip 1 from the side of a nozzle orifice 3.
Figure 3B:
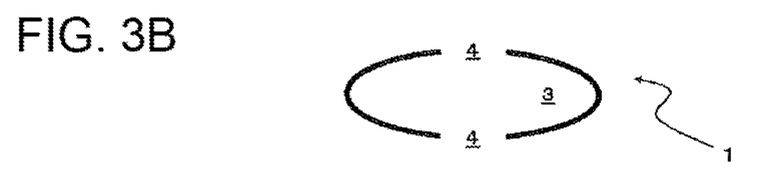
Figure 3C:
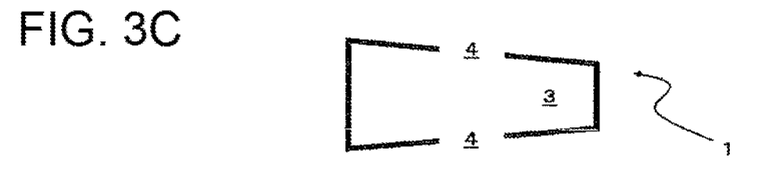

Other embodiments of the nozzle tip 1 are exemplarily shown in FIG. 3. The nozzle tips 1 exemplarily shown in FIG. 3 are those showing main parts when observed from the side of the nozzle orifice 3. FIG. 3(*a*) shows a rectangular nozzle orifice. FIG. 3(*b*) shows an oval nozzle orifice. FIG. 3(*c*) shows a trapezoidal one. Furthermore, it is possible to cite even one (not shown in the drawings) in which each side is rounded. Furthermore, it may have a gourd shape, a dumb-bell shape, a triangular shape, etc. In view of the nozzle production easiness and easiness to obtain glass fibers that are non-circular in cross-sectional shape and are symmetrical about the longitudinal center axis, an oblong cross-section as shown in FIG. 1 or a rectangular cross-section as shown in FIG. 3(*a*) is preferable. In particular, the shape as shown in FIG. 1 is preferable.

Figure 4:
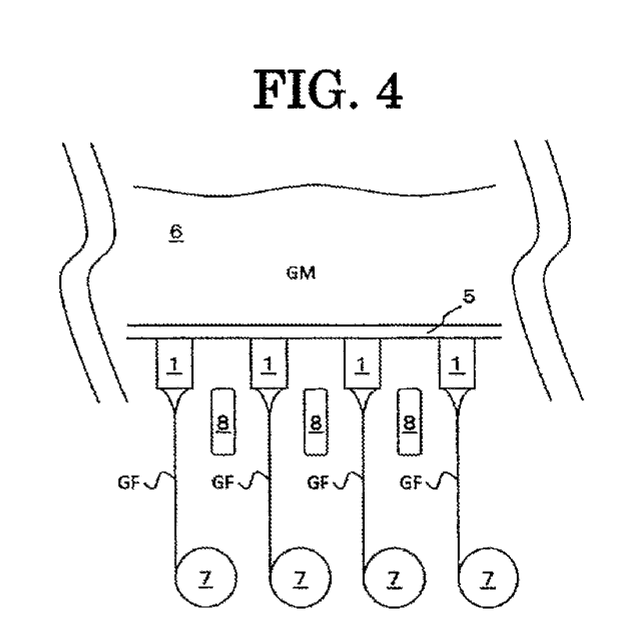
FIG. 4 is a view schematically showing main parts of a use example of the nozzle tips. 1 of the present invention.

Next, a glass fibers production example using the nozzle tip 1 is explained. FIG. 4 is a view schematically showing main parts of a use example of the nozzle tips 1 of the present invention.

It is possible to produce glass fibers GF with a flat cross-section that are symmetrical about a longitudinal center axis of a flat cross-sectional shape by going through the steps of:

passing a glass melt through the nozzle orifice 3 of the nozzle tip 1, which is fixed to a bottom surface of the storage tank 6 that stores the glass melt; and drawing and discharging the glass melt GM out of the nozzle orifice 3, thereby quenching and fiberizing the glass melt.

The nozzle tips 1 are fixed to the bottom surface portion 5 and are used by arranging 1 to 5,000 of them. If increasing the number of the nozzle tips, the number of glass fibers that can be produced at the same time will increase. Therefore, the number of nozzle tips relates greatly to productivity. However, if the number of nozzle tips to be formed on a single bottom surface portion 5 exceeds 5,000, there may occur some defects, such as uneven heat distribution to the nozzle tips, since the bottom surface portion 5 is too large. In view of this, the number of the nozzle tips is preferably 50 to 1,000.

For the bottom surface portion 5, it is possible to use platinum or a platinum alloy, which is the same as the nozzle tip 1. In particular, considering strength, it is preferable to use a platinum rhodium alloy containing 5-30 weight % of rhodium in platinum, and a strengthened platinum rhodium alloy in which zirconia fine particles are dispersed in the platinum rhodium alloy, for each member.

In the vicinity of the nozzle tip 1, it is optional to suitably dispose a cooling fin 8 to promote cooling of the glass fiber. As the cooling fin, it is optional to use a known cooling fin that is normally used when spinning glass fibers. For the cooling fin, it is possible to use metals high in thermal conductivity, selected from copper, silver, gold, iron, nickel, chromium, platinum, rhodium, palladium, and alloys of these. In case that cooling with the cooling fin is insufficient, it is possible to achieve a further cooling by making a liquid such as water flow in the cooling fin. The location to install the cooling fin 8 is not particularly specified, but it is optional to arrange the installation height of the cooling fin 8 so that the upper end of the cooling fin 8 is opposed to the cut-out 4.

The glass melt stored in the storage tank 6 is drawn through the nozzle orifice 3 and made into a glass fiber via cooling process. The drawn glass is pulled by a winder 7, etc. to promote fiber formation. As the glass constituting the glass fiber, it is possible to use one having a known glass composition. As the known glass composition, it is possible to cite E glass, C glass, S glass, D glass, ECR glass, A glass, AR glass, etc. Of these, E glass is preferable. This is because E glass has a composition less in alkali components. Thus, it makes alkali dissolution difficult and causes less effect on a resin material when complexed with resin. The temperature of the glass melt varies depending on glass composition, too. In the case of E glass composition, it is preferable to make an adjustment such that the temperature when passing through the nozzle tip 1 becomes 1100 to 1350° C.

It is preferable that the glass coming out of the nozzle tip 1 is drawn at a high speed by a collet-equipped winder, etc. The drawing speed can suitably be adjusted, preferably 100 to 5000 m/min. If the drawing speed becomes faster, the glass fiber becomes thinner. If the drawing speed becomes slower, the glass fiber becomes thicker. Therefore, the drawing speed is determined from the viewpoint of the glass fiber configuration design. The glass fiber can be drawn by various methods, in addition to a winder equipped with a collet. It is possible to preferably produce chopped strands, for example, by a direct chopper to chop the glass fiber while it is drawn.

By the above operation, it is possible to obtain glass fibers GF having a flat cross-section that is symmetrical about the longitudinal center axis of the flat cross-section. As examples of the flat cross-sectional shape of the glass fibers GF that are obtained to correspond to the flat cross-sectional shape of the nozzle orifice, it is possible to cite shapes such as oblong shape, gourd shape, dumb-bell shape, etc., including shapes analogous to these, too. The size of the cross-section of the glass fibers GF is suitably designed by the size of the nozzle orifices 3, the temperatures of the glass melt and the nozzle tips, the winding speed of the winders 7, etc. For example, the length of the longitudinal center axis can be adjusted to 4-80 µm, preferably 10-60 µm, and the length of the short-direction center axis can be adjusted to 1-20 µm, preferably 2.5-15 µm. Flatness ratio obtained by dividing the length of the longer axis by the length of the shorter axis can be adjusted to, for example, 2 to 10, etc.

Before the glass fiber is wound by a winder, etc., a sizing agent may suitably be applied thereto using an applicator, etc. As the sizing agent, it is possible to use a known sizing agent formed from a surfactant, a silane coupling agent, a pH adjuster, a resin, etc. In the case of conducting a processing such as grinding, no sizing agent may be used. Applying or not applying the sizing agent is suitably designed in accordance with the use of the fibers.

The obtained glass fiber can suitably be subjected to processings, such as cutting, grinding, heating, textile making, paper making, twist making, etc. By these processings, it is possible to have a shape of chopped strands, chopped strands mat, milled fiber, surface mat, glass paper, glass fiber textile, roving cloth, etc.

The glass fibers having a flat cross-section that is symmetrical about the longitudinal center axis of the flat cross-sectional shape can be made into a fiber-reinforced resin article by a complexation with resin. As the resin to be complexed with the glass fibers, it is possible to use a known resin. It is possible to cite, for example, thermoplastic resins, such as low-density polyethylene, high-density polyethylene, polypropylene, polyvinyl chloride, polystyrene, methacrylic resin, ABS resin, metallocene resin, polyamide, polyacetal, polycarbonate, polyphenylene ether, polyethylene terephthalate, polybutylene terephthalate, liquid crystal polymer, polyphenylene sulfide, polyimide, polyether sulfone, polyether ether ketone and fluororesin, thermosetting resins, such as epoxy resin, silicone resin, phenol resin, unsaturated polyester resin and polyurethane, rubbers, elastomers, etc. The fiber-reinforced resin article may contain 0.01 to 80 weight % of glass fibers. As to glass fibers that have a non-circular cross-section and are symmetrical about the longitudinal center axis of the present invention, the glass fibers themselves are more easily stacked. Therefore, even in case that the amount of the glass fibers in the fiber-reinforced resin article is adjusted to 30 weight % or more, the increase of the amount of glass fibers contributes to improvement of strength, and it is also possible to suppress warping that tends to occur at the molding such as injection molding.

For a complexation between the glass fibers and resin, it is possible to use a known kneading method and a device therefor. If it is a thermoplastic resin, it is preferable to use a heat-melting kneader. It is possible to use a single-screw kneader, a twin-screw kneader, a single-screw kneading extruder, a twin-screw kneading extruder, and a heating-device-equipped kneader or mixer.

Furthermore, for a fiber-reinforced resin article prepared by kneading the glass fibers and a resin, it is possible to use a known molding method in accordance with characteristics and shape of the complexation product. In the case of thermoplastic resins, it is possible to cite injection molding method and blow molding method. In the case of thermosetting resins, it is possible to cite hand lay-up method, spray-up method, drawing molding method, SMC method, BMC method, transfer molding method, etc. As to glass fibers that have a non-circular cross-section and are symmetrical about the longitudinal center axis of the present invention, the glass fibers themselves are more easily stacked. Therefore, even in the case of using injection molding method, it is possible to suppress warping of the molded product, and they are preferable. The molded complexation product (a fiber-reinforced resin article containing the glass fibers) can be used as a part or housing of cars, electronic devices, etc., which is required to possess strength, heat resistance and chemical resistance.

EXAMPLES

In the following, the present invention is explained more specifically by showing examples and comparative examples, but the present invention is never limited by these. The glass fibers obtained by the present examples were evaluated by the method mentioned in the following.

[Glass Fibers Evaluation Method]

A bundle of the produced glass fibers was hardened with a cold mounting resin (Marumoto Struers, EpoFix), and its cut section was polished. Then, the obtained polished surface was observed with a field emission scanning electron microscope (S-4500, Hitachi, Ltd.), and it was judged from the fiber section whether or not having a shape that is symmetrical about the longitudinal center axis (longer axis). Furthermore, the longer axis and the longest portion of the short-length direction (shorter axis) of 10 fibers were measured. The average of the longer axes, the average of the shorter axes, and the average of the values each as flatness ratio obtained by dividing the longer axis by the shorter axis were calculated. Furthermore, as to flatness ratio, percentage of standard deviation relative to the average was calculated as standard deviation (%) of flatness ratio.

Example 1

A nozzle tip 1 having a shape shown in FIG. 1 was mounted on a bottom surface of a glass storage tank 6. A glass melt GM of E glass composition melted at 1160° C. in the glass storage tank 6 was drawn through a nozzle orifice 3, and the drawn glass was wound at 958 m/min to obtain a glass fiber.

The used nozzle tip 1 was one equipped with a structure in which the thickness of the long-side wall and the short-side wall was 0.3 mm, the horizontal section of the nozzle orifice 3 was 4 mm in longer axis and 1 mm in shorter axis, the length of the projection portion was 3 mm, the width of the cut-out 4 was 1.2 mm (30% of the longer axis of the nozzle orifice 3), the height of the cut-out 4 was 1.8 mm, and the shape of the cut-out 4 was rectangular. Furthermore, the areal percentage of the opening portion was 21%.

Figure 5:
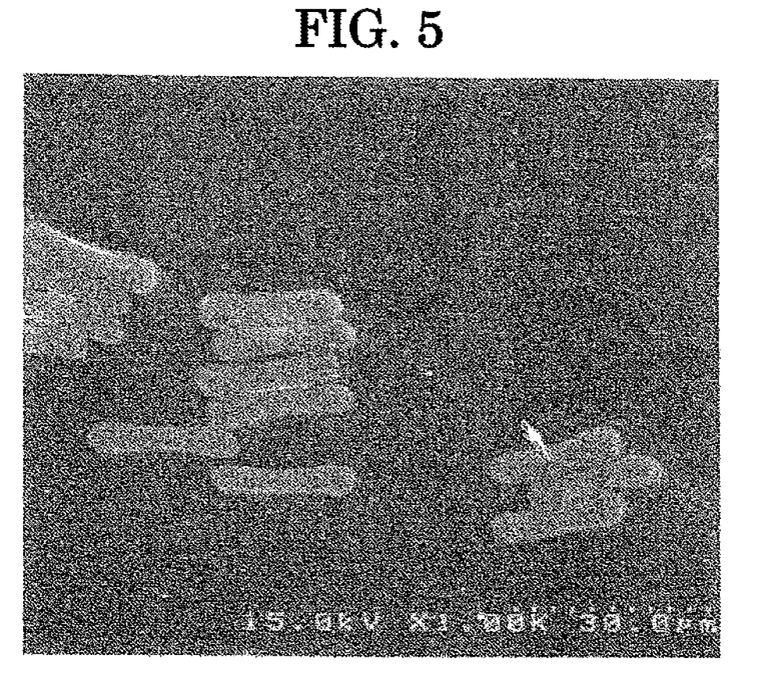
FIG. 5 is a view showing one prepared by observing the cross-sectional shape of glass fibers obtained by Example 1 of the present invention with a field emission scanning electron microscope and then projecting the observation results on a photograph.

The obtained fibers were evaluated in accordance with the above-mentioned glass fiber evaluation method. With this, they were confirmed as being glass fibers that have a flat cross-section and are symmetrical about the longitudinal center axis (longer axis) (the result of observing the glass fiber sections with a field emission scanning electron microscope is shown in FIG. 5). The length of the longitudinal center axis of the obtained fibers was 21.9 μm, the maximum value of the short direction length was 5.2 μm, and flat ratio was 4.2. Furthermore, standard deviation of flatness ratio was 6.7%, showing a low dispersion in flatness ratio.

Example 2

Glass fibers were spun in the same conditions as those of Example 1, except in that the temperature of the glass melt in the glass storage tank was 1180° C. As the obtained fibers were evaluated in accordance with the evaluation method of the above glass fibers, they were confirmed as being glass fibers that have a flat cross-section and are symmetrical about the longitudinal center axis (longer axis). The length of the longitudinal center axis of the obtained fibers was 20.1 μm, the maximum value of the short direction length was 8.2 μm, and flat ratio was 2.5. Furthermore, standard deviation of flatness ratio was 7.1%, showing a low dispersion in flatness ratio.

Example 3

Glass fibers were spun in the same conditions as those of Example 2, except in that the width of the cut-out 4 of the nozzle tip was 1.6 mm (40% of the length of the longitudinal center axis of the nozzle orifice 3) and that the areal percentage of the opening portion was 28%. As the obtained fibers were evaluated in accordance with the evaluation method of the above glass fibers, they were confirmed as being glass fibers that have a flat cross-section and are symmetrical about the longitudinal center axis (longer axis). The length of the longitudinal center axis of the obtained fibers was 23.9 μm, the maximum value of the short direction length was 8.1 μm, and flat ratio was 3.0. Furthermore, standard deviation of flatness ratio was 21.5%, showing a low dispersion in flatness ratio.

Example 4

Glass fibers were spun in the same conditions as those of Example 1, except in that the longer axis of the nozzle orifice 3 was 5.4 mm, the shorter axis was 1 mm, the length of the projection portion was 3 mm, the width of the cut-out 4 was 1.2 mm (22% of the length of the longitudinal center axis of the nozzle orifice 3), the cut-out height was 1.8 mm, and the areal percentage of the opening portion was 15%. As the obtained fibers were evaluated in accordance with the evaluation method of the above glass fibers, they were confirmed as being glass fibers that have a flat cross-section and are symmetrical about the longitudinal center axis (longer axis). The length of the longitudinal center axis of the obtained fibers was 22.5 μm, the maximum value of the short direction length was 9.1 μm, and flat ratio was 2.5. Furthermore, standard deviation of flatness ratio was 3.7%, showing a low dispersion in flatness ratio.

Example 5

Glass fibers were spun in the same conditions as those of Example 1, except in that there was used a nozzle tip in which the longer axis of the nozzle orifice 3 was 4.8 mm, the shorter axis was 1.2 mm, the length of the projection portion was 3 mm, the width of the cut-out 4 was 1.6 mm (33% of the length of the longitudinal center axis of the nozzle orifice 3), the cut-out height was 1.8 mm, and the areal percentage of the opening portion was 20%, and that the temperature of the glass melt in the glass storage tank 1190° C. As the obtained fibers were evaluated in accordance with the evaluation method of the above glass fibers, they were confirmed as being glass fibers that have a flat cross-section and are symmetrical about the longitudinal center axis (longer axis). The length of the longitudinal center axis of the obtained fibers was 31.3 μm, the maximum value of the short direction length was 10.3 μm, and flat ratio was 3.0. Furthermore, standard deviation of flatness ratio was 3.4%, showing a low dispersion in flatness ratio.

Example 6

Glass fibers were spun in the same conditions as those of Example 5, except in that the width of the cut-out 4 was 2.0 mm (42% of the length of the nozzle orifice's longitudinal center axis) and that the areal percentage of the opening portion was 25%. As the obtained fibers were evaluated in accordance with the evaluation method of the above glass fibers, they were confirmed as being glass fibers that have a flat cross-section and are symmetrical about the longitudinal center axis (longer axis). The length of the longitudinal center axis of the obtained fibers was 37.8 μm, the maximum value of the short direction length was 9.5 μm, and flat ratio was 4.0. Furthermore, standard deviation of flatness ratio was 4.9%, showing a low dispersion in flatness ratio.

Example 7

Glass fibers were spun in the same conditions as those of Example 5, except in that an end surface on the side of the cut-out 4 of the long-side wall 21 of the nozzle tip 1 had an inclined surface resulting from a gradual decrease of the thickness of the long-side wall toward the cut-out 4, that the inclined surface faced the side of the nozzle orifice 3, and that all of the six inclined surfaces were 0.2 mm in width of the inclined surface, 0.3 mm in thickness of the inclined surface, and 56.3 degrees in inclination angle of the inclined surface (a main part of the nozzle tip 1 is shown in FIG. 7). As the obtained fibers were evaluated in accordance with the evaluation method of the above glass fibers, they were confirmed as being glass fibers that have a flat cross-section and are symmetrical about the longitudinal center axis (longer axis). The length of the longitudinal center axis of the obtained fibers was 34.4 μm, the maximum value of the short direction length was 9.1 μm, and flat ratio was 3.8. Furthermore, standard deviation of flatness ratio was 2.9%, showing a low dispersion in flatness ratio. Furthermore, this nozzle tip shape suppresses leaking and spreading of the glass melt from the cut-outs 4 toward the nozzle long-side wall 21 and the base plate 5. Therefore, it was one that prevented the nozzle tip and the base plate from being easily stained, as compared with a nozzle tip free from inclined surfaces.

Example 8

The cut-out 4 was formed into a trapezoid with a gradual decrease of the width from the side of the nozzle orifice 3 toward the base plate side. The shape of the cut-out 4 was formed into a trapezoid that was 2.0 mm in width of the side of the nozzle orifice 3, 1.2 mm in width of the base plate side, and 1.8 mm in cut-out height so that the areal percentage of the opening portion became 20%. Except those, glass fibers were spun in the same conditions as those of Example 5. It was possible to continuously spin glass fibers, but a so-called pulsation phenomenon occurred, in which the glass melt flowed out partly along the oblique side of the cut-out with an inclination to the short-side wall 22 on one side. As the obtained fibers were evaluated in accordance with the evaluation method of the above glass fibers, they were confirmed as being glass fibers that have a flat cross-section and are symmetrical about the longitudinal center axis (longer axis). The length of the longitudinal center axis of the obtained fibers was 26.2 μm, the maximum value of the short direction length was 11.2 μm, and flat ratio was 2.3. Furthermore, standard deviation of flatness ratio was 29.5%, showing a higher dispersion in flatness ratio, as compared with the nozzles of Example 1, etc. with a rectangular cut-out.

Comparative Example 1

It was tried to obtain glass fibers in the same conditions as those of Example 1, except in that the width of the cut-out 4 was adjusted to 2.4 mm (60% of the length of the longitudinal center axis of the nozzle orifice 3) and that the areal percentage of the opening portion was adjusted to 42%, but spinning was not possible as the fibers came apart. The cause of this is believed to be low in stability of fluidity of the glass melt in the nozzle orifice 3 of the glass melt.

Comparative Example 2

Figure 6:
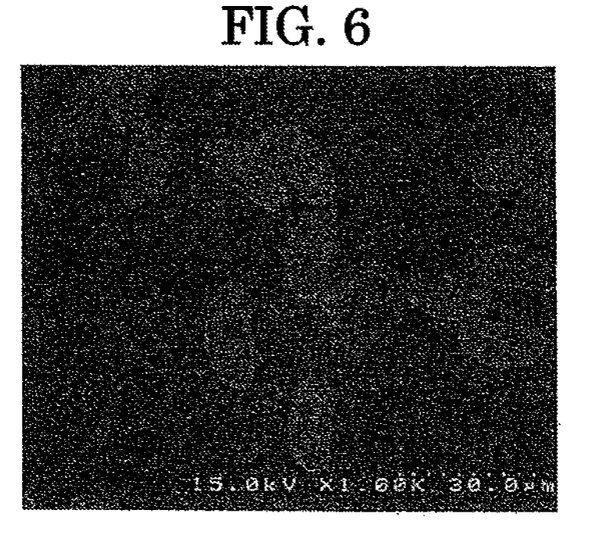
FIG. 6 is a view showing one prepared by observing the cross-sectional shape of glass fibers obtained by Comparative Example 2 of the present invention with a field emission scanning electron microscope and then projecting the observation results on a photograph.

Glass fibers were spun in the same conditions as those of Example 2, except in that the long-side wall 21 on one side was not provided with a cut-out. As the obtained fibers were evaluated in accordance with the evaluation method of the above glass fibers, it was not possible to obtain glass fibers having a flat cross-section that is symmetrical about the longitudinal center axis of the flat cross-sectional shape (the result of observing the glass fiber sections with a field emission scanning electron microscope is shown in FIG. 6).

EXPLANATION OF SIGNS

1: a nozzle tip
2: a projection portion
21: a long-side wall
211: an end surface on the side of cut-out 4 of the long-side wall 21
212: a summit portion of the end surface on the side of cut-out 4 of the long-side wall 21
22: a short-side wall
3: a nozzle orifice
4: a cut-out
5: a bottom surface portion
6: a storage tank
7: a winder
8: a cooling fin

The invention claimed is:

1. A nozzle tip for producing a glass fiber that is flat in cross-sectional shape, the nozzle tip being used by downwardly projecting from a bottom surface portion of a storage tank that stores a glass melt,
the nozzle tip comprising a pair of long-side walls and a pair of short-side walls, each of the long-side walls and the short-side walls comprising platinum or a platinum alloy, and a nozzle orifice for discharging the glass melt,
wherein the nozzle orifice has a flat hole shape in horizontal cross-section,
wherein each of the long-side walls has a cut-out on a discharge side of the glass melt, a width of the cut-out being 10-55% of a length of a longitudinal center axis of the flat hole shape of the nozzle orifice, the width of the cut-out being defined along the longitudinal center axis of the flat hole shape of the nozzle orifice, and
wherein the pair of long-side walls has a symmetrical shape about the center axis of the nozzle orifice,
wherein an end surface on a side of the cut-out of the long-side wall has an inclined surface resulting from a gradual decrease of a thickness of the long-side wall toward the side of the cut-out, and
wherein the inclined surface faces an inner side of the nozzle tip.

2. The nozzle tip as claimed in claim 1, wherein the cut-out is formed at a center on a discharge side of the long-side wall.

3. The nozzle tip as claimed in claim 1, wherein an opening portion by the cut-outs has an area (a total of an area of the two cut-outs) that is 1% to 45% of a total area (the total area containing the area of the opening portion by the cut-outs) of an inner periphery of the pair of long-side walls and the pair of short-side walls.

4. The nozzle tip as claimed in claim 3, wherein the opening portion by the cut-outs has an area (a total of an area of the two cut-outs) that is 3% to 40% of the total area (the total area containing the area of the opening portion by the cut-outs) of the inner periphery of the pair of long-side walls and the pair of short-side walls.

5. The nozzle tip as claimed in claim 1, wherein a ratio of a length of the longitudinal center axis to a length of a longest portion in a short-length direction of the nozzle orifice is from 2 to 8.

6. The nozzle tip as claimed in claim 5, wherein the ratio of the length of the longitudinal center axis to the length of the longest portion in the short-length direction of the nozzle orifice is from 3 to 8.

7. The nozzle tip as claimed in claim 5, wherein the ratio of the length of the longitudinal center axis to the length of the longest portion in the short-length direction of the nozzle orifice is from 3 to 6.

8. A method for producing a glass fiber with a flat cross-section that is symmetrical about a longitudinal center axis of a flat cross-sectional shape, the glass fiber producing method comprising the steps of:
passing a glass melt through the nozzle orifice of the nozzle tip of claim 1, which is fixed to a bottom surface of a storage tank that stores the glass melt; and
drawing and discharging the glass melt out of the nozzle orifice, thereby quenching and fiberizing the glass melt.

9. The nozzle tip as claimed in claim 1, wherein the flat hole shape of the nozzle orifice is an oblong shape.

10. The nozzle tip as claimed in claim 1, wherein the flat hole shape of the nozzle orifice is one selected from the group consisting of a rectangular shape, an oval shape, a trapezoidal shape, a gourd shape, a dumb-bell shape, and a triangular shape.

11. The nozzle tip as claimed in claim 1, wherein the platinum alloy is a first alloy comprising platinum and a noble metal that is at least one selected from the group consisting of rhodium, gold, palladium and silver, or a reinforced metal in which fine particles of zirconia are dispersed in the noble metal or the first alloy.

12. The nozzle tip as claimed in claim 11, wherein the first alloy is a platinum rhodium alloy containing 5-30 weight % of rhodium in platinum, and the reinforced metal is a strengthened platinum rhodium alloy in which zirconia fine particles are dispersed in the platinum rhodium alloy.

13. The nozzle tip as claimed in claim 1, wherein the width of the cut-out is 15-55% of the length of the longitudinal center axis of the flat hole shape of the nozzle orifice.

14. The nozzle tip as claimed in claim 1, wherein the width of the cut-out is 20-55% of the length of the longitudinal center axis of the flat hole shape of the nozzle orifice.

15. The nozzle tip as claimed in claim 1, wherein a length of the longitudinal center axis of the nozzle orifice is 2-10 mm, and a length of a longest portion in a short-length direction of the nozzle orifice is 0.3-2 mm.

16. The nozzle tip as claimed in claim 15, wherein the length of the longitudinal center axis of the nozzle orifice is 2-8 mm, and the length of the longest portion in the short-length direction of the nozzle orifice is 0.5-2 mm.

17. The nozzle tip as claimed in claim 1, wherein the nozzle tip has a vertical length of 0.5-7 mm, and a capacity of 0.3-140 $mm^3$.

18. The nozzle tip as claimed in claim 1, wherein the cut-out has a height that is 2-80% of the vertical length of the nozzle tip.

19. The nozzle tip as claimed in claim 1, wherein the cut-out is rectangular in shape.

\* \* \* \* \*